(12) United States Patent
Ilyadis

(10) Patent No.: US 9,313,827 B2
(45) Date of Patent: Apr. 12, 2016

(54) RADIO OVER ETHERNET FOR RADIO ACCESS NETWORK AND CLOUD-RAN

(71) Applicant: Broadcom Corporation, Irvine, CA (US)

(72) Inventor: Nicholas Ilyadis, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 215 days.

(21) Appl. No.: 13/904,972

(22) Filed: May 29, 2013

(65) Prior Publication Data

US 2014/0185601 A1 Jul. 3, 2014

Related U.S. Application Data

(60) Provisional application No. 61/747,744, filed on Dec. 31, 2012, provisional application No. 61/799,614, filed on Mar. 15, 2013.

(51) Int. Cl.
*H04W 4/00* (2009.01)
*H04W 88/18* (2009.01)
*H04W 28/06* (2009.01)
*H04W 88/08* (2009.01)

(52) U.S. Cl.
CPC ............ *H04W 88/181* (2013.01); *H04W 28/06* (2013.01); *H04W 88/085* (2013.01)

(58) Field of Classification Search
CPC .. H04W 88/085; H04L 27/2626; H04L 69/08
See application file for complete search history.

(56) References Cited

U.S. PATENT DOCUMENTS

2011/0135013 A1* 6/2011 Wegener ................. 375/241
2012/0113972 A1* 5/2012 Liu et al. ................. 370/338

* cited by examiner

*Primary Examiner* — Alpus H Hsu
*Assistant Examiner* — Elton Williams
(74) *Attorney, Agent, or Firm* — Sterne, Kessler, Goldstein & Fox P.L.L.C.

(57) ABSTRACT

An architecture for transporting radio samples, compressed samples or pre-processed radio samples in symbol form across a communication network, including a packet switched network such as Ethernet. Further, the conversion of the radio samples from streaming data to a packetized format can also be performed. Processing of radio samples can be performed in a centralized location, where the centralized location can service multiple radio heads that are located across a large geographical area. This centralized processing can be referred to as Cloud-RAN. The radio heads can also perform pre-processing to reduce effective data rates across the communication network. Further, one or more of the components of the communication network can perform timing synchronization utilizing, for example, Synchronous Ethernet (SyncE) and/or IEEE 1588.

21 Claims, 6 Drawing Sheets

RADIO OVER ETHERNET FOR RADIO ACCESS NETWORK AND CLOUD-RAN

CROSS REFERENCE TO RELATED APPLICATIONS

This patent application claims the benefit of U.S. Provisional Patent Application No. 61/747,744, filed Dec. 31, 2012, entitled "Radio Over Ethernet For Radio Access Network And Cloud-RAN," and U.S. Provisional Patent Application No. 61/799,614, filed Mar. 15, 2013, entitled "Radio Over Ethernet For Radio Access Network And Cloud-RAN," each of which is incorporated herein by reference in its entirety.

FIELD

This application relates generally to wireless communication systems, and more particularly to wireless communication systems utilizing Ethernet as a communication link interface.

BACKGROUND

In wireless communication systems, wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including: amplitude modulation (AM), frequency modulation (FM), quadrature amplitude modulation (QAM), phase shift keying (PSK), quadrature phase shift keying (QPSK), and/or orthogonal frequency-division multiplexing (OFDM), and others.

In many wireless communication environments, one of the first or second wireless communication device functions as a base station that provides communication between user devices and a central communication infrastructure. In such a base station, a radio unit is typically positioned at a physically high point of a cellular tower for communication with user devices. However, a significant portion of signal processing actually takes place in a local or remote baseband processor. For example, the baseband processor may be located a significant distance from the radio unit at the top of the tower (e.g., in a bunker underground at the bottom of the tower, or in a nearby communications facility).

In conventional base stations, the baseband processor and the radio unit communicate with one another via a communication link interface. For example, the Common Public Radio Interface (CPRI) provides a standardized interface to connect Radio Equipment Controllers (e.g., baseband processor) and Radio Equipment (e.g., radio unit). Alternatively, the communication link interface may be established utilizing the interface defined in the Open Base Station Architecture Initiative (OBSAI).

CPRI is described in detail in "Common Public Radio Interface (CPRI)—Interface Specification, Version 5.0," published Sep. 9, 2011, which is incorporated herein by reference in its entirety. OBSAI is described in detail in "Open Base Station Architecture Initiative—BTS System Reference Document, Version 2.0," and "Open Base Station Architecture Initiative—Reference Point 4 Specification, Version 1.1," both of which are incorporated herein by reference in their entirety.

In operation, the baseband processor can control the radio unit to communicate with one or more wireless devices via the communication link interface. For example, the baseband processor can timestamp data to be transmitted and then provide the time stamped data to the radio unit. The radio unit can then transmit the data at the time specified in the timestamp. This cooperation between the baseband processor and the radio unit ensures that the data is transmitted at the time specified by the baseband processor, and ultimately at the time specified by the service provider of the wireless communication environment.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1A:
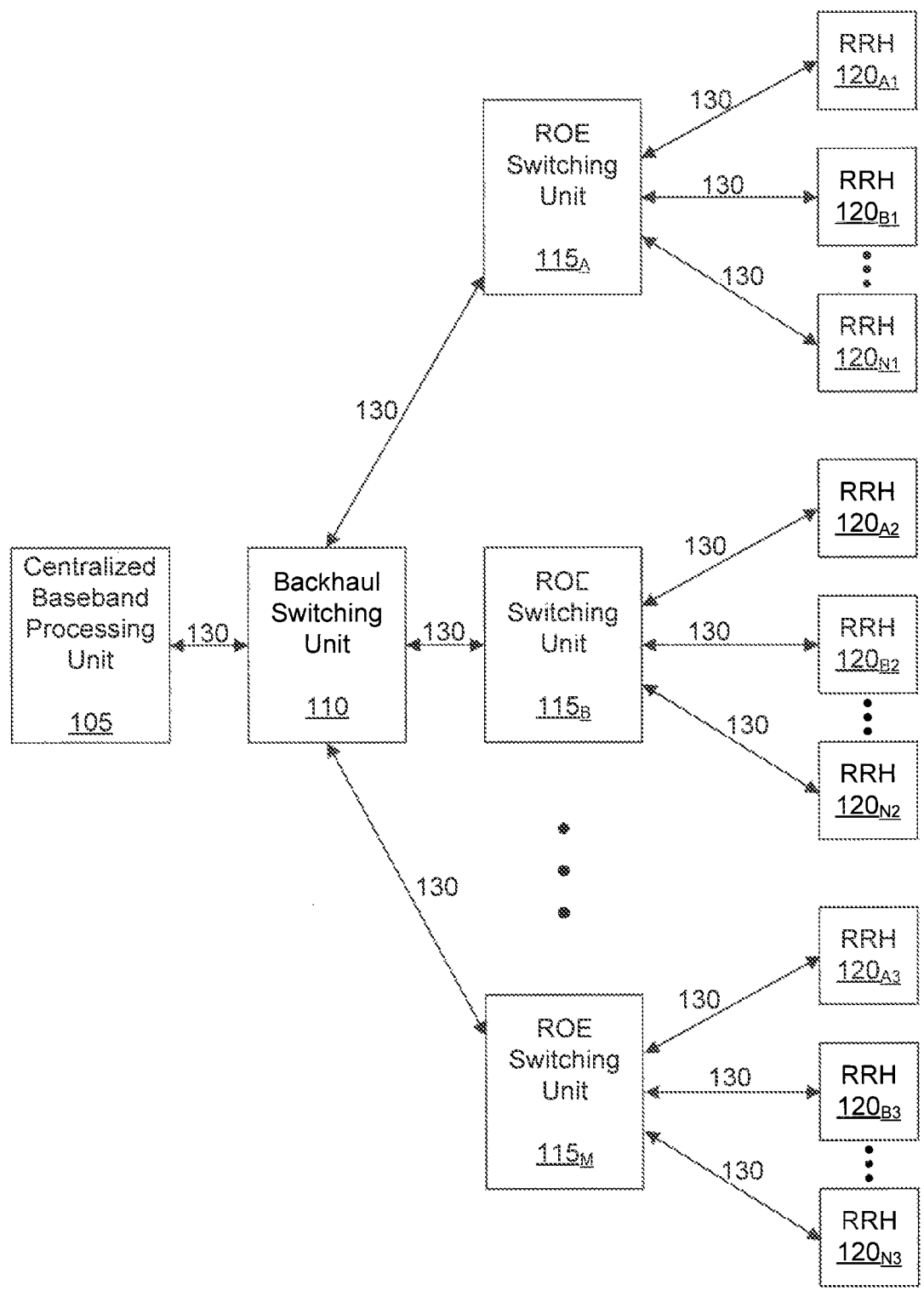
FIG. 1A illustrates an exemplary wireless communication environment in accordance with an exemplary embodiment.

FIG. 1A illustrates an exemplary wireless communication environment 100A. The wireless communication environment 100A provides wireless communication of information, such as one or more commands and/or data, between wireless communication devices. The wireless communication devices may each be implemented as a standalone or a discrete device, such as a base station, remote radio head, mobile telephone or mobile telephone peripheral device (e.g., Bluetooth headset), or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

In an exemplary embodiment, the wireless communication environment 100A includes one or more components that cooperatively operate to form one or more base stations. The one or more base stations are capable of both wireless transmission and wireless reception utilizing one or more various wireless communication protocols, such as one or more various cellular protocols specified in, for example, the International Mobile Telecommunications-2000 (IMT-2000) standard, developed by the 3rd generation partnership project (3GPP), and/or developed by the $3^{rd}$ generation partnership project 2 (3GPP2), WiMax (IEEE 802.16), Long Term Evolution (LTE), and the like. Each of these various protocols/standards is incorporated herein by reference in its entirety.

The exemplary wireless communication environment 100A can include a centralized baseband processing unit 105 communicatively coupled to one or more backhaul switching units 110, one or more radio-over-Ethernet (ROE) switching units 115, and one or more remote radio heads (RRH) 120 via communication links 130.

Each of the components of the wireless communication environment 100A can be configured to communicate with one or more other components in the wireless communication environment 100A utilizing one or more wired communication protocols, including, for example, the Ethernet standard as defined in Institute of Electrical and Electronics Engineers (IEEE) 802.3 (e.g., 10 Gigabit Ethernet, 100 Gigabit Ethernet, etc.), CPRI, and OBSAI, and/or one or more wireless communication protocols, including, for example, millimeter wave frequency protocols, microwave frequency protocols, WiFi (IEEE 802.11), and one or more various cellular protocols specified in, for example, the International Mobile Telecommunications-2000 (IMT-2000) standard, developed by the 3rd generation partnership project (3GPP), and/or developed by the $3^{rd}$ generation partnership project 2 (3GPP2), WiMax (IEEE 802.16), Long Term Evolution (LTE), and the like. Each of these various protocols/standards is incorporated herein by reference in its entirety.

In exemplary embodiments in which one or more of the components of the wireless communication environment 100A are configured to communicate utilizing the Ethernet protocol (e.g., 10 Gigabit Ethernet, 100 Gigabit Ethernet, or the like) and/or one or more wireless communication protocols, the wireless communication environment 100A can utilize one or more precision timing and/or timing synchronization protocols to provide precision timing and synchronization between the various components of the wireless communication environment 100A. For example, the wireless communication environment 100A can utilize the Precision Time Protocol (PTP) standard as defined in IEEE 1588 and/or the Synchronous Ethernet (SyncE) standard as defined in International Telecommunication Union Telecommunication Standardization Sector (ITU-T) G.8262/Y.1362, "Timing Characteristics of a Synchronous Ethernet Equipment Slave Clock," published July 2010. Each of these various protocols/standards is incorporated herein by reference in its entirety.

Each of the components of the wireless communication environment 100A can be configured to route radio signal streams utilizing any well-known low-latency routing operations as will be apparent to those skilled in the relevant art(s) so as to provide low-latency routing of the various signal streams. Further, each of the components of the wireless communication environment 100A can be configured to route radio signal streams and/or packetized radio signal streams utilizing any well-known jitter-reduction process as will be apparent to those skilled in the relevant art(s) to provide low jitter functionality and reduced jitter buffering within the various devices.

As illustrated in FIG. 1A, in an exemplary embodiment, the centralized baseband processing unit 105 is communicatively coupled to the backhaul switching unit 110. The backhaul switching unit 110 is communicatively coupled to one or more ROE switching units $115_{A-M}$, which are each communicatively coupled to respective one or more RRHs 120. It should be appreciated that each respective RRH 120 communicatively coupled to a ROE switching unit 115 may be different from, or similar to, one or more other RRHs 120 communicatively coupled to the same ROE switching unit 115, and/or different from, or similar to, one or more RRHs 120 communicatively coupled another one of the ROE switching units 115. Similarly, each respective ROE switching unit 115 communicatively coupled to the backhaul switching unit 110 may be different from, or similar to, one or more other ROE switching units 115.

In an exemplary embodiment, the centralized baseband processing unit 105 is configured to communicate with the backhaul switching unit 110 utilizing the Ethernet protocol (e.g., 10 Gigabit Ethernet, 100 Gigabit Ethernet, or the like), and/or CPRI and/or OBSAI. The backhaul switching unit 110 is configured to communicate with the ROE switching units 115 utilizing the Ethernet protocol, and the ROE switching units 115 are configured to communicate with the RRHs 120 utilizing the Ethernet protocol, and/or CPRI and/or OBSAI.

It should be appreciated that, although FIG. 1A illustrates the ROE switching units 115 being connected in parallel to the backhaul switching unit 110 and the RRHs 120 being connected in parallel to each of the ROE switching units 115, some or all of the ROE switching units 115 can be connected in series to the backhaul switching unit 110 and/or some or all the RRHs 120 can be connected in series to the ROE switching units $115_{A-N}$. For example, two or more ROE switching units 115 can be connected in series to backhaul switching unit 110, and/or two or more RRHs 120 can be connected in series to a single ROE switching unit 115.

With continued reference to FIG. 1A, the centralized baseband processing unit 105 includes suitable logic, circuitry, and/or code that is configured to perform various transmit signal processing functions on outgoing signals before forwarding those signals to one or more of the RRHs 120 via the backhaul switching unit 110 and one or more ROE switching units 115, and to perform various receive signal processing functions on incoming signals received from one or more of the RRHs 120. For example, the centralized baseband processing unit 105 is configured to perform various coding and modulation functions, frequency selection and conversion, filtering, compression, etc., during signal transmission, and counterpart receive functions during signal reception.

The centralized baseband processing unit 105 can be configured to utilize precision timing and/or timing synchronization protocols to provide precision timing and synchronization between the centralized baseband processing unit 105 and one or more of the other components of the wireless communication environment 100A. For example, the centralized baseband processing unit 105 can be configured to utilize the PTP (IEEE 1588) and/or SyncE standards discussed above.

In utilizing the precision timing and/or timing synchronization protocols, an internal clock of the centralized baseband processing unit 105 can be configured to synchronize with a grandmaster clock of the wireless communication environment 100A. Alternatively, the internal clock of the centralized baseband processing unit 105 can serve as the grandmaster clock for the other various devices of the wireless communication environment 100A. In both cases, the internal clocks of the other various devices of the wireless communication environment 100A can then be configured to synchronize with the internal clock of the centralized baseband processing unit 105 so that the internal clocks of the various devices of the wireless communication environment 100A are synchronized to a single (i.e., grandmaster) clock. For example, each of the internal clocks of the RRHs 120 can be synchronized with the internal clock of a respective ROE switching unit 115, the internal clocks of each of the ROE switching units 115 can be synchronized with the internal clock of the backhaul switching unit 110, which can be synchronized with the internal clock of the centralized baseband processing unit 105 (which can be synchronized with the grandmaster clock in embodiments where the internal clock of the centralized baseband processing unit 105 is not serving as the grandmaster clock for the wireless communication environment 100A). In other words, the various devices of the wireless communication environment 100A can be configured to synchronize with each other following the hierarchal relationships of the various devices. It should be appreciated that the synchronization can be initiated by the centralized baseband processing unit 105 so as to propagate up the hierarchal architecture to the RRHs 120, or from the RRHs 120 down the hierarchal architecture to the centralized baseband processing unit 105.

In an exemplary embodiment, to facilitate the precision timing and/or timing synchronization between the various devices of the wireless communication environment 100A, the various devices are configured to insert timestamps into the packetized radio signal streams before transmitting the packetized radio signal streams to one or more other devices. The timestamps are then used by the receiving device(s) to synchronize its internal clock with the internal clock of the transmitting device.

In an exemplary embodiment, the centralized baseband processing unit 105 is configured to perform packetization on radio signal streams transmitted by the centralized baseband processing unit 105 and/or de-packetization on received radio signal streams. Using the packetization/de-packetization, the centralized baseband processing unit 105 can be configured to communicate with the backhaul switching unit 110 utilizing the Ethernet protocol. For example, to facilitate communication with the backhaul switching unit 110 utilizing the Ethernet protocol, the centralized baseband processing unit 105 is configured to perform packetization on radio signal streams and to transmit the packetized radio signals to the backhaul switching unit 110, and to perform de-packetization on packetized radio signals received from the backhaul switching unit 110.

Further, the centralized baseband processing unit 105 can be configured to insert timestamps into the packetized radio signal streams before transmitting the packetized radio signal streams to the backhaul switching unit 110. Upon receipt of the radio signal streams having the inserted timestamps, the backhaul switching unit 110 can be configured to utilize the timestamps to synchronize the internal clock of the backhaul switching unit 110 with the internal clock of the centralized baseband processing unit 105. The backhaul switching unit 110 can then insert timestamps in the packetized radio signal streams that are subsequently transmitted to one or more of the ROE switching units 115. Similarly, if the ROE switching units 115 are configured to communicate with one or more RRHs 120 utilizing the Ethernet protocol, the ROE switching units 115 are configured to insert timestamps in the packetized radio signal streams that are subsequently transmitted to the one or more RRHs 120 to facilitate the synchronization of each of the internal clocks of the one or more RRHs 120.

In an exemplary embodiment, the centralized baseband processing unit 105 is configured to perform compression and/or transmit Physical (PHY) layer processing on signals prior to transmission of the signals to one or more components of the wireless communication environment 100A via one or more communication links 130, and to perform respective receive processing (e.g., decompression and/or receive PHY layer processing) on signals received from one or more components of the wireless communication environment 100A via one or more communication links 130. That is, it should be appreciated that the aforementioned and foregoing references to the performance of compression and transmit PHY layer processing include the performance of respective receive processes (decompression and receive PHY layer processing). Further, the compression/decompression processing can include, for example, lossless and/or lossy compression/decompression, and the transmit/receive PHY layer processing can include, for example, symbol generation from samples of signals and/or sample recovery from received symbols.

In an exemplary embodiment, the centralized baseband processing unit 105 is configured to perform load balancing of one or more of the RRHs 120 serviced by the centralized baseband processing unit 105. For example, the centralized baseband processing unit 105 can control the load of one or more of the RRHs 120 based on one or more factors, including, for example, bandwidth requirements, time of day, etc. Load balancing allows for a centralized baseband processing unit 105 to have a reduced maximum load capacity such that the maximum load capacity is less than the combined load capacity of the baseband processors used in the conventional 1:1 baseband processor to radio unit configuration. That is, the load capacity of a centralized baseband processing unit 105 servicing, for example five RRHs 120 would be less than the combined load capacity of five individual baseband processors respectively servicing five individual radio units.

The backhaul switching unit 110 includes suitable logic, circuitry, and/or code that can be configured to route radio signal streams received from the centralized baseband processing unit 105 utilizing the CPRI and/or OBSAI protocols, and/or packetized radio signal streams received utilizing the Ethernet protocol, to one or more RRHs 120 via one or more ROE switching units 115.

In an exemplary embodiment, the backhaul switching unit 110 also includes suitable logic, circuitry, and/or code that can be configured to perform packetization on radio signal streams received from the centralized baseband processing unit 105 utilizing the CPRI and/or OBSAI protocols. That is, in a case where the backhaul switching unit 110 receives non-packetized radio signal streams (e.g., radio signal streams received utilizing the CPRI and/or OBSAI protocols), the backhaul switching unit 110 can packetize the radio signal streams to generate packetized radio signal streams that are routed to the various components of the wireless communication environment 100A utilizing, for example, the Ethernet protocol. Conversely, if the backhaul switching unit 110 has received packetized radio signal streams from the centralized baseband processing unit 105, the backhaul switching unit 110 can route the packetized radio signal streams to one or more of the ROE switching units 115 utilizing, for example, the Ethernet protocol. Similarly, the backhaul switching unit 110 can perform de-packetization on packetized radio signal streams received from one or more of the ROE switching units 115 in situations where the backhaul switching unit 110 communicates with the centralized baseband processing unit 105 utilizing the CPRI and/or OBSAI protocols, or the backhaul switching unit 110 can route the packetized radio signal streams received from the one or more of the ROE switching units 115 without performing de-packetization in situations where the backhaul switching unit 110 communicates with the centralized baseband processing unit 105 utilizing the Ethernet protocol.

The backhaul switching unit 110 can be configured to utilize precision timing and/or timing synchronization protocols to provide precision timing and synchronization between the backhaul switching unit 110 and the one or more ROE switching units 115. In an exemplary embodiment, to facilitate the precision timing and/or timing synchronization, the backhaul switching unit 110 is configured to insert timestamps into the packetized radio signal streams before transmitting the packetized radio signal streams to the one or more ROE switching units 115. The timestamps are then used by the one or more ROE switching units 115 to synchronize their internal clocks with the internal clock of the backhaul switching unit 110.

In an exemplary embodiment, the backhaul switching unit 110 is configured to perform compression/decompression and/or transmit/receive PHY layer processing on radio signal streams received from the centralized baseband processing unit 105 and/or the one or more ROE switching units 115, and/or on radio signal streams transmitted to the centralized baseband processing unit 105 and/or the one or more ROE switching units 115. The compression/decompression can include, for example, lossless and/or lossy compression/decompression, and the transmit/receive PHY layer processing can include, for example, symbol generation from samples of signals and sample recovery from received symbols.

Each of the ROE switching units 115 include suitable logic, circuitry, and/or code that is configured to perform packetization on radio signal streams received utilizing the CPRI and/or OBSAI protocols from one or more RRHs 120, and to perform de-packetization on packetized radio signal streams received utilizing the Ethernet protocol from the backhaul switching unit 110. That is, in a case where the ROE switching units 115 receive non-packetized radio signal streams (e.g., radio signal streams received utilizing the CPRI and/or OBSAI protocols) from one or more RRHs 120, the ROE switching units 115 can packetize the radio signal streams to generate packetized radio signal streams that are routed to the backhaul switching unit 110. Conversely, if the ROE switching units 115 receive packetized radio signal streams from one or more RRHs 120, the ROE switching units 115 can route the packetized radio signal streams to the backhaul switching unit 110 utilizing the Ethernet protocol. Similarly, the ROE switching units 115 can perform de-packetization on packetized radio signal streams received from the backhaul switching unit 110 to generate non-packetized radio signal streams that are routed to the one or more RRHs 120, utilizing, for example, the CPRI and/or OBSAI protocols. In cases where the ROE switching units 115 communicate with the RRHs 120 utilizing the Ethernet protocol, the ROE switching units 115 can route the packetized radio signal streams received from the backhaul switching unit 110 to one or more of the ROE switching units 115 without performing de-packetization.

The ROE switching units 115 can be configured to utilize precision timing and/or timing synchronization protocols to provide precision timing and synchronization between the ROE switching units 115 and the one or more RRHs 120. In an exemplary embodiment, to facilitate the precision timing and/or timing synchronization, the ROE switching units 115 are configured to insert timestamps into the packetized radio signal streams before transmitting the packetized radio signal streams to the one or more RRHs 120. The timestamps are then used by the one or more RRHs 120 to synchronize their internal clocks with the internal clocks of the ROE switching units 115.

In an exemplary embodiment, the ROE switching units 115 are configured to perform compression/decompression and/or transmit/receive PHY layer processing on packetized and/or non-packetized radio signal streams received from and/or transmitted to the backhaul switching unit 110. Similarly, the ROE switching units 115 are configured to perform compression/decompression and/or transmit/receive PHY layer processing on packetized and/or non-packetized radio signal streams received from and/or transmitted to the RRHs 120. The compression/decompression can include, for example, lossless and/or lossy compression/decompression, and the transmit/receive PHY layer processing can include, for example, symbol generation from samples of signals and sample recovery from received symbols. In an exemplary embodiment, the ROE switching units 115 are configured to perform the transmit/receive PHY layer processing and/or the compression/decompression following the de-packetization of a packetized radio signal stream.

Each of the remote radio heads (RRH) 120 includes suitable logic, circuitry, and/or code that can be configured to perform additional processing on outgoing signals received from the centralized baseband processing unit 105 via one or more of the communication links 130 and/or on incoming signals received from one or more other wireless devices of the wireless communication environment 100A, and to transmit/receive the signals to/from one or more wireless devices of the wireless communication environment 100A. For example, the RRHs 120 can perform various frequency conversion functions, filtering, amplification, and/or compression during signal transmission and/or reception.

In an exemplary embodiment, each respective set of RRHs 120 are configured to transmit/receive radio signals to/from ROE switching units 115 via communication links 130 utilizing CPRI and/or OBSAI. Further, in an exemplary embodiment, the RRHs 120 are configured to wirelessly transmit/receive radio signals to/from ROE switching units 115 via one or more wireless communication links 130 that are configured to utilize wireless CPRI (wCPRI). The wireless communication links 130 can be configured to wirelessly transmit/receive radio signals using one or more of the wireless communication protocols discussed above. The implementation of wCPRI allows for a communication link to be established in cases where a physical communication link (e.g., fiber optical cable) cannot be used (or such use is impractical or not desired).

In an exemplary embodiment, one or more of the RRHs 120 includes suitable logic, circuitry, and/or code that is configured to perform packetization on incoming signals received from one or more other wireless devices of the wireless communication environment 100A before the now-packetized incoming signals are communicated to a respective ROE switching unit 115 utilizing the Ethernet protocol, and to perform de-packetization on packetized radio signal streams received utilizing the Ethernet protocol from the respective ROE switching unit 115. That is, the one or more of the RRHs 120 can perform the packetization/de-packetization on radio signal streams to communicate with the ROE switching units 115 via communication links 130 utilizing the Ethernet protocol. In this case, the RRHs 120 perform the packetization/de-packetization instead of the ROE switching units 115 as discussed above. The packetized radio signal streams are then de-packetized by either the backhaul switching unit 110 or the centralized baseband processing unit 105. Similarly, if packetized radio signal streams are received from one or more other wireless devices, an RRH 120 can de-packetize the packetized radio signal stream to communicate with a respective ROE switching unit 115 utilizing CPRI and/or OBSAI, or de-packetization can be omitted and the packetized radio signal stream can be routed to the respective ROE switching unit 115 utilizing the Ethernet protocol.

The RRHs 120 can be configured to utilize precision timing and/or timing synchronization protocols to provide precision timing and synchronization between the ROE switching units 115 and the one or more RRHs 120. In an exemplary embodiment, timestamps can be inserted into the packetized radio signal streams to facilitate the precision timing and/or timing synchronization.

In an exemplary embodiment, one or more RRHs 120 are configured to perform compression/decompression and/or transmit/receive PHY layer processing on packetized radio signal streams received from and/or transmitted to a respective ROE switching unit 115. Similar to the discussion above regarding the other components of the wireless communication environment 100, the compression/decompression can include, for example, lossless and/or lossy compression/decompression, and the transmit/receive PHY layer processing can include, for example, symbol generation from samples of signals and sample recovery from received symbols.

Figure 1B:
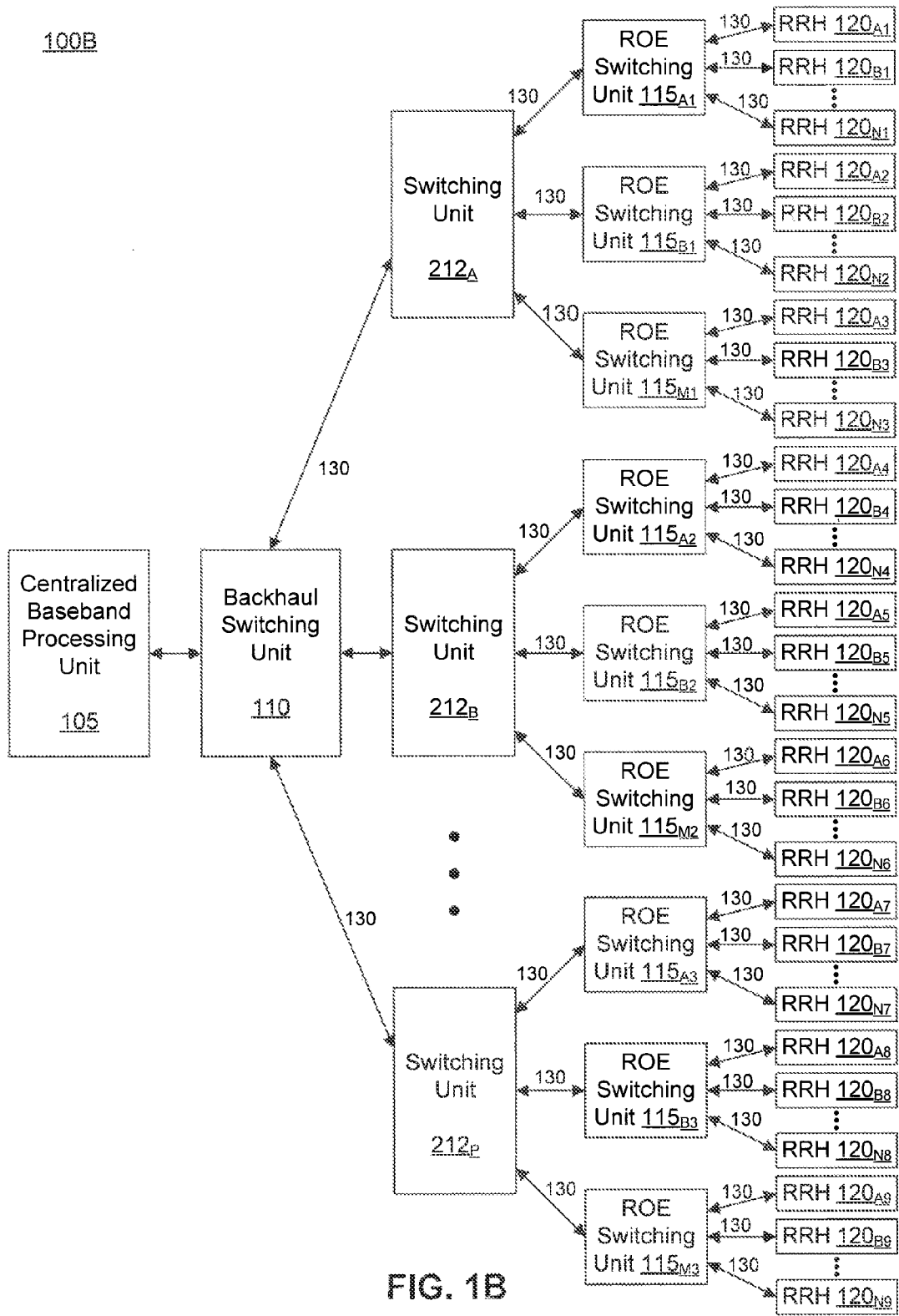
FIG. 1B illustrates an exemplary wireless communication environment in accordance with an exemplary embodiment.

FIG. 1B illustrates a wireless communication environment 100B according to an exemplary embodiment. Wireless communication environment 100B is similar to the wireless communication environment 100A of FIG. 1A. The wireless communication environment 100B includes similar components to those discussed above with respect to the wireless communication environment 100A. In particular, the wireless communication environment 100B includes a centralized baseband processing unit 105, a backhaul switching unit 110, one or more ROE switching units 115, and one or more RRHs 120. Therefore, the discussion of these components has been omitted for brevity.

In an exemplary embodiment, the wireless communication environment 100B also includes one or more switching units 212, which are each communicatively coupled to a backhaul switching unit 110. Each of the switching units 212 include suitable logic, circuitry, and/or code that can be configured to route packetized radio signal streams received utilizing the Ethernet protocol to one or more of the sets of ROE switching units 115. It should be appreciated that each respective RRH 120 communicatively coupled to a ROE switching unit 115 may be different from, or similar to, one or more other RRHs 120 communicatively coupled to the same ROE switching unit 115, and/or different from, or similar to, one or more RRHs 120 communicatively coupled another one of the ROE switching units 115. Similarly, each respective ROE switching unit 115 communicatively coupled to a switching unit 212 may be different from, or similar to, one or more other ROE switching units 115 communicatively coupled to the same switching unit 212, and/or different from, or similar to, one or more ROE switching units 115 communicatively coupled another one of the switching units 212. Further, each of the switching units 212 may be different from, or similar to, one or more other switching units 212.

As illustrated in FIG. 1B, the centralized baseband processing unit 105 is communicatively coupled to the backhaul switching unit 110, which is communicatively coupled to the one or more switching units 212. Each of the switching units 212 are communicatively coupled to one or more ROE switching units 115, which are each communicatively coupled to one or more RRHs 120. As such, the wireless communication environment 100B provides an increased number of ROE switching unit 115 sets that are coupled to the backhaul switching unit 110, thereby increasing the overall size of the wireless communication environment 100B. Further, it should be appreciated by one skilled in the relevant art(s) that the number of each of the various components is not limited to the exemplary numbers described herein, and that the number of each of the various components can increase or decrease based on the size of the wireless communication environment 100B.

Figure 2A:
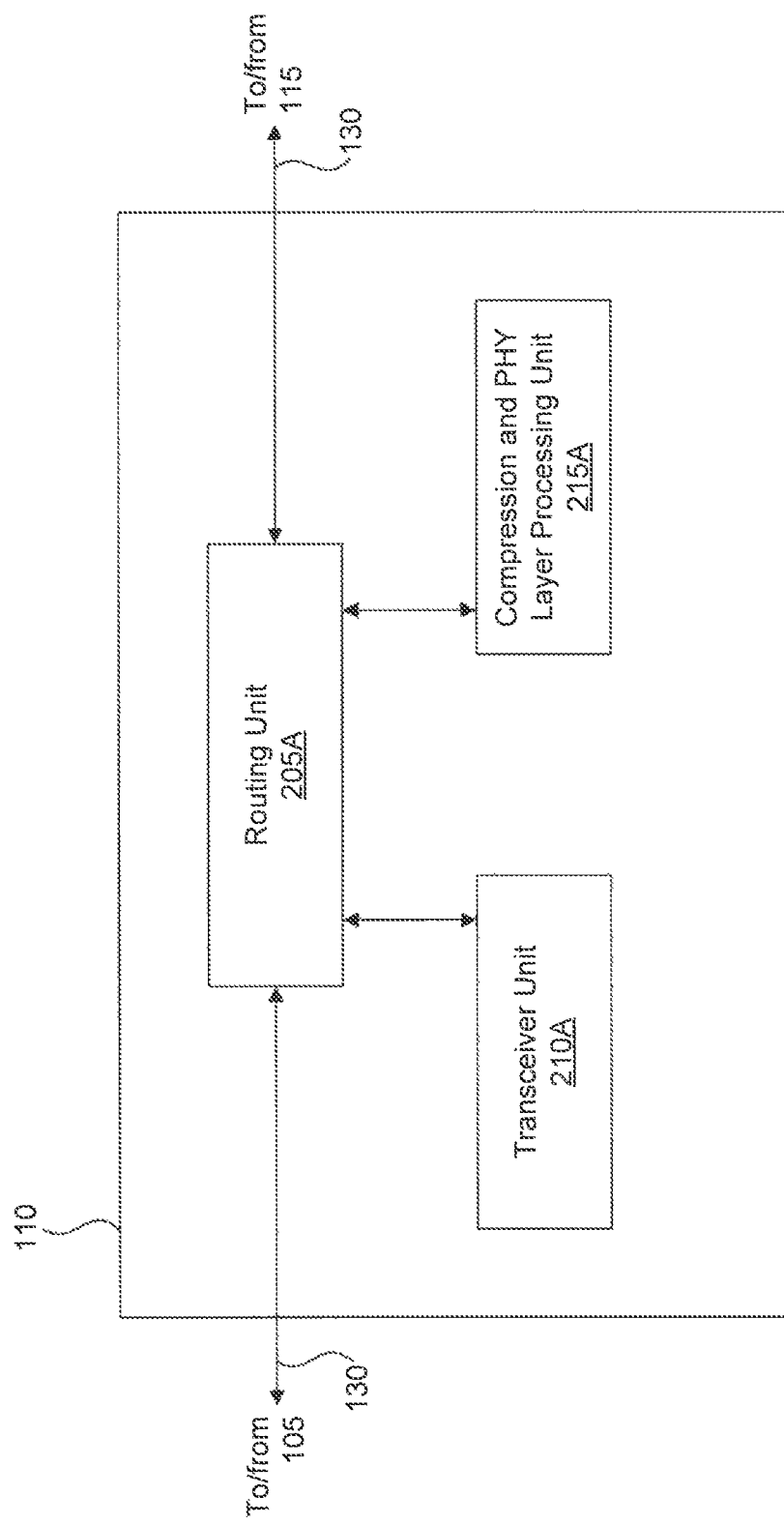
FIG. 2A illustrates a block diagram of an exemplary backhaul switching unit in accordance with an exemplary embodiment.

FIG. 2A illustrates backhaul switching unit 110 according to an exemplary embodiment of the present disclosure. The backhaul switching unit 110 includes a routing unit 205A, a transceiver unit 210A and a compression and PHY layer processing unit 215A.

The routing unit 205A includes suitable logic, circuitry, and/or code that is configured to route radio signal streams received from the centralized baseband processing unit 105 to one or more ROE switching units $115_{A-N}$, and vice versa. As discussed in more detail below, the routing unit 205A is also configured to provide the radio signal streams to the transceiver unit 210A and/or compression and PHY layer processing unit 215A for further processing.

The transceiver unit 210A includes suitable logic, circuitry, and/or code that is configured to determine a transmission protocol utilized by the backhaul switching unit 110 for the reception and transmission of radio signal streams (e.g., whether the radio signal streams include packetized radio signals (e.g., Ethernet protocol) or non-packetized radio signals (e.g., CPRI/OBSAI)), and to perform various processing on the radio signal stream based on the determined transmission protocol, including a conversion of the transmission protocol (e.g., conversion from Ethernet to CPRI/OBSAI, and vice versa), and/or a packetization/de-packetization of radio signal streams.

For example, if the backhaul switching unit 110 receives a radio signal stream utilizing CPRI and/or OBSAI, the transceiver unit 210A can packetize the radio signal streams to form a packetized radio signal stream that can be transmitted utilizing the Ethernet protocol. Conversely, if the backhaul switching unit 110 receives a packetized radio signal stream utilizing the Ethernet protocol, the transceiver unit 210A can de-packetize the packetized radio signal stream to form a de-packetized radio signal stream that can be transmitted utilizing CPRI and/or OBSAI. Further, the backhaul switching unit 110 can omit the packetization/de-packetization and route the radio signal stream utilizing the same communication protocol used in the reception of the radio signal stream.

The compression and PHY layer processing unit 215A includes suitable logic, circuitry, and/or code that is configured to perform compression/decompression and/or transit/receive PHY layer processing on radio signals received by the backhaul switching unit 110 prior to transmission of the radio signals to one or more components (e.g., centralized baseband processing unit 105, a ROE switching unit 115, or a switching unit 212) of the wireless communication environment 100A/100B via one or more communication links 130.

In an exemplary embodiment, the compression and PHY layer processing unit 215A is configured to perform lossless and/or lossy compression/decompression on signals utilizing one or more well-known compression/decompression techniques and/or perform transmit/receive PHY layer processing on the radio signals, such as, for example, performing symbol generation from samples of the radio signal stream, and/or sample recovery from received symbols.

Figure 2B:
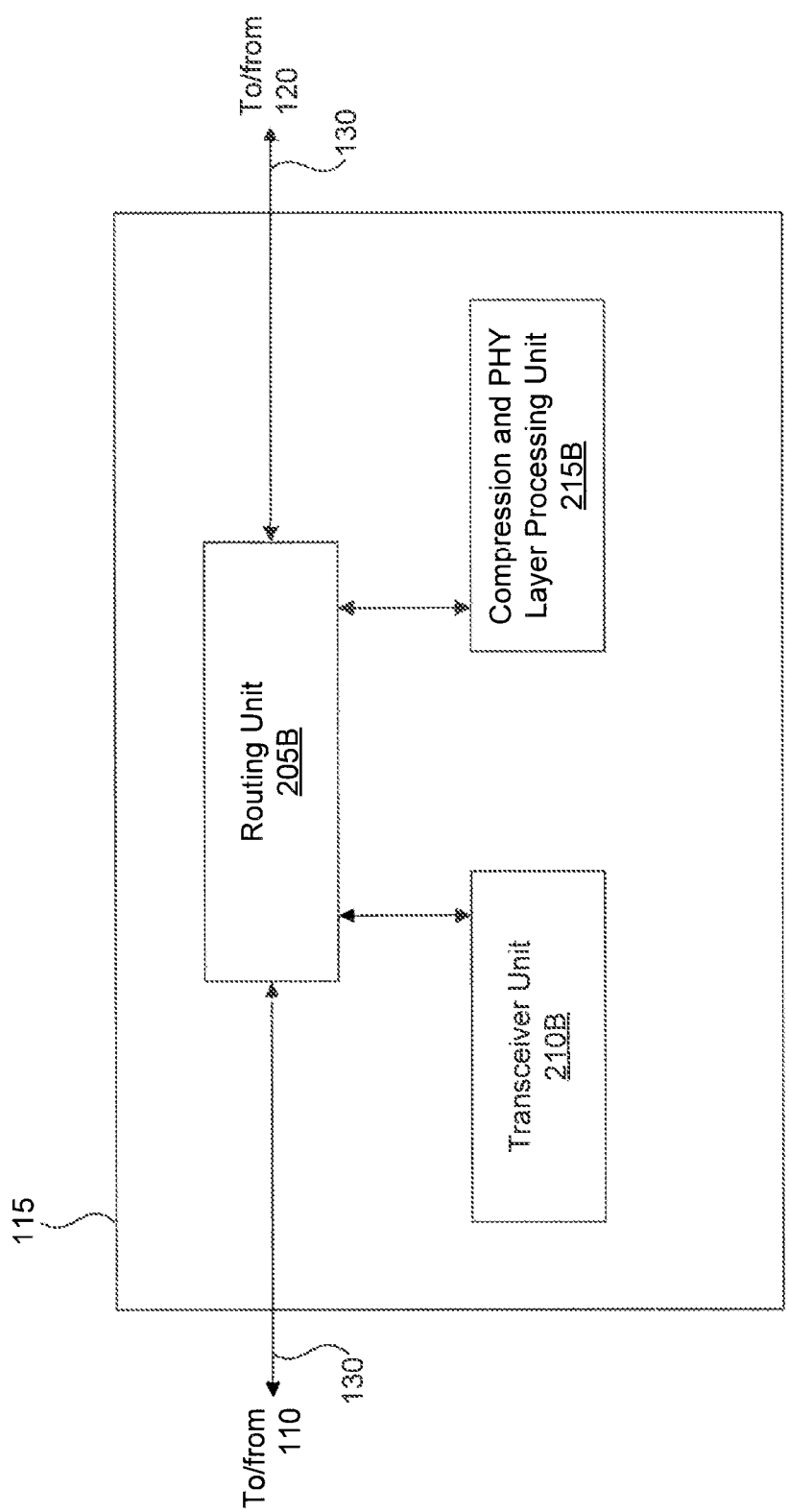
FIG. 2B illustrates a block diagram of an exemplary radio over Ethernet (ROE) switching unit in accordance with an exemplary embodiment.

FIG. 2B illustrates an ROE switching unit 115 according to an exemplary embodiment of the present disclosure. The ROE switching units 115 includes a routing unit 205B, a transceiver unit 210B and a compression and PHY layer processing unit 215B. The routing unit 205B, transceiver unit 210B and compression and PHY layer processing unit 215B are similar to the routing unit 205A, transceiver unit 210A and compression and PHY layer processing unit 215A discussed above with respect to the backhaul switching unit 110 of FIG. 2A.

The routing unit 205B includes suitable logic, circuitry, and/or code that is configured to route radio signal streams received from the backhaul switching unit 110 to one or more RRHs 120$_{A-N}$, and vice versa. As discussed in more detail below, the routing unit 205B is also configured to provide the radio signal streams to the transceiver unit 210B and/or compression and PHY layer processing unit 215B for further processing.

The transceiver unit 210B includes suitable logic, circuitry, and/or code that is configured to determine a transmission protocol utilized by the ROE switching unit 115 for the reception and transmission of radio signal streams, and to perform various processing on the radio signal streams based on the determined transmission protocol, including a conversion of the transmission protocol (e.g., conversion from Ethernet to CPRI/OBSAI, and vice versa), and/or a packetization/de-packetization of radio signal streams.

For example, if the ROE switching unit 115 receives a radio signal stream utilizing CPRI and/or OBSAI, the transceiver unit 210A can packetize the radio signal stream to form a packetized radio signal stream that can be transmitted utilizing the Ethernet protocol. Conversely, if the ROE switching unit 115 receives a packetized radio signal stream utilizing the Ethernet protocol, the transceiver unit 210A can de-packetize the packetized radio signal stream to form a de-packetized radio signal stream that can be transmitted utilizing CPRI and/or OBSAI. Further, the ROE switching unit 115 can omit the packetization/de-packetization and route the radio signal stream utilizing the same communication protocol used in the reception of the radio signal stream.

The compression and PHY layer processing unit 215B includes suitable logic, circuitry, and/or code that is configured to perform compression/decompression and/or transmit/receive PHY layer processing on radio signals received by the ROE switching unit 115 prior to transmission of the radio signals to one or more components (e.g., one or more RRHs 120, backhaul switching unit 110, or a switching unit 212) of the wireless communication environment 100A/100B via one or more communication links 130.

In an exemplary embodiment, the compression and PHY layer processing unit 215B is configured to perform lossless and/or lossy compression/decompression on signals utilizing one or more well-known compression/decompression techniques and/or perform transmit/receive PHY layer processing on the radio signals, such as, for example, performing symbol generation from samples of the radio signal stream, and/or sample recovery from received symbols.

Figure 3:
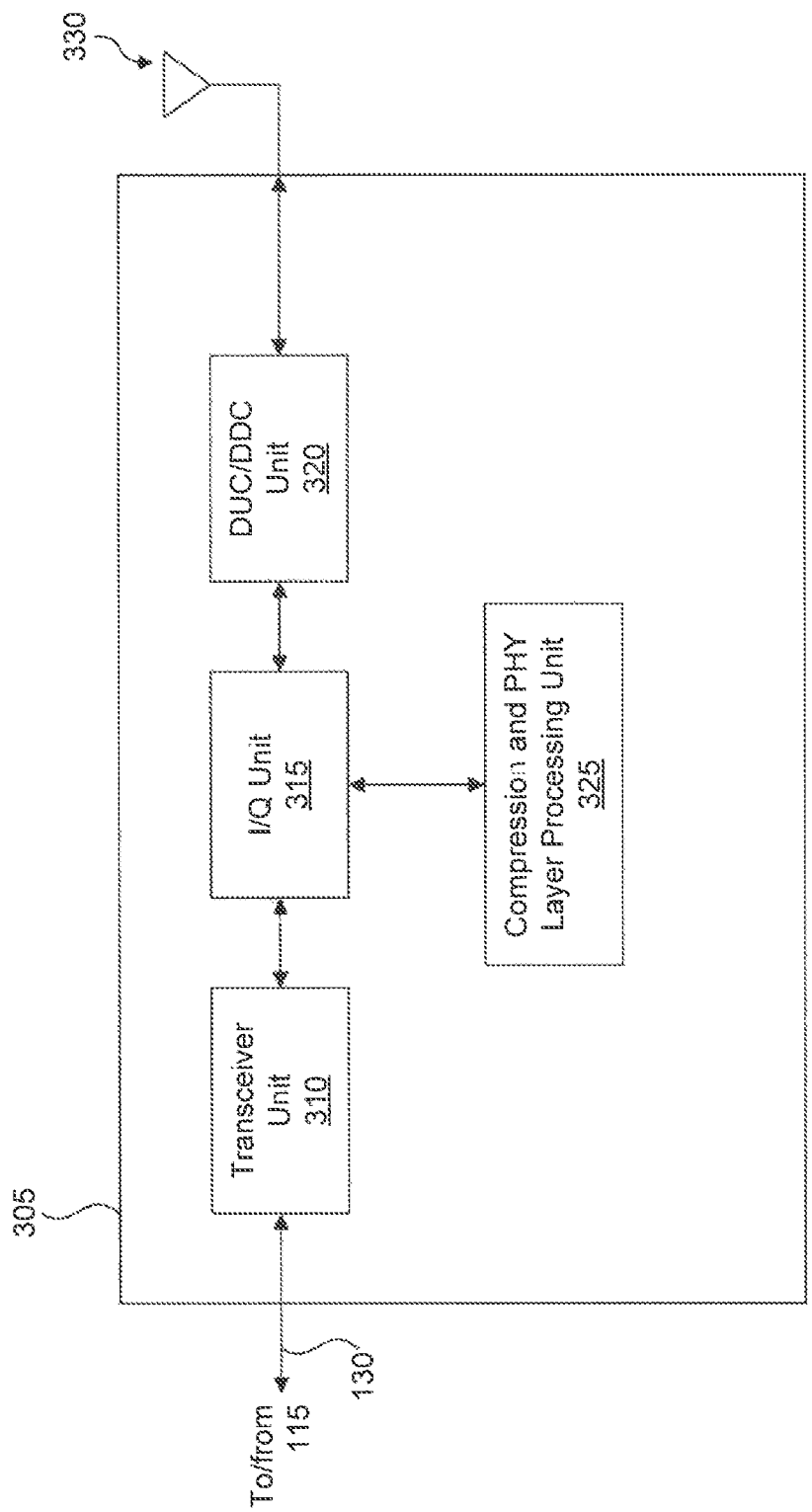
FIG. 3 illustrates a block diagram of an exemplary digital front-end (DFE) in accordance with an exemplary embodiment.

FIG. 3 illustrates a digital front-end (DFE) 305 that can be implemented in one or more RRHs 120 of the wireless communication environment 100A and/or the wireless communication environment 100B according to an exemplary embodiment of the present disclosure.

The DFE 305 includes suitable logic, circuitry, and/or code that is configured to process radio signal streams received from one or more other wireless devices of the wireless communication environment 100A/100B via antenna 330 and/or to process outgoing signals received from an ROE switching unit 115 via one or more of the communication links 130 prior to transmission via the antenna 330. Those skilled in the relevant art(s) will recognize that the antenna 330 may include an integer array of antennas, and that the antenna 330 may be capable of both transmitting and receiving radio signals.

In an exemplary embodiment, the DFE 305 is configured to utilize precision timing and/or timing synchronization protocols to provide precision timing and synchronization between the RRHs 120 and a respective ROE switching unit 115. For example, the DFE 305 can be configured to utilize the PTP (IEEE 1588) and/or SyncE standards discussed above. Further, to facilitate the precision timing and/or timing synchronization, the DFE 305 can be configured to insert timestamps into the packetized radio signal streams before transmission.

In an exemplary embodiment, the DFE 305 includes transceiver unit 310, in-phase and quadrature-phase (I/Q) unit 315, digital up-convertor (DUC)/digital down-converter (DDC) unit 320, and compression and PHY layer processing unit 325.

The DUC/DDC unit 320 includes suitable logic, circuitry, and/or code that is configured to perform digital frequency up-converting and/or digital frequency down-converting on signals received from and/or transmitted to the antenna 330. For example, the DUC/DDC unit 320 can perform digital up-conversion and/or digital down-conversion on radio signal streams received from antenna 330, and/or digital up-conversion and/or digital down-conversion on radio signal streams prior to transmitting the radio signal streams via the antenna 330.

The I/Q unit 315 includes suitable logic, circuitry, and/or code that is configured to sample signals received from the transceiver unit 310 prior to transmitting the signals to the DUC/DDC unit 320, and/or to sample signals received from the DUC/DDC unit 320 prior to transmitting the signals to the transceiver unit 310. The I/Q unit 315 is also configured to generate I/Q samples from received radio signal streams and/or to provide the I/Q samples to the compression and PHY layer processing unit 325.

The transceiver unit 310 includes suitable logic, circuitry, and/or code that is configured to determine a transmission protocol being used, and to perform various processing on radio signal streams based on the determined transmission protocol, including a conversion of the transmission protocol (e.g., conversion from Ethernet to CPRI/OBSAI, and vice versa), a packetization/de-packetization of radio signal stream, and/or precision timing and synchronization (e.g., timestamp) processing. In particular, the transceiver unit 310 determines the transmission protocol being utilized for radio signal streams (e.g. 10 Gigabit Ethernet, CPRI, OBSAI, or the like) received from one or more components of the wireless communication environment 100A/100B via the communication link 130, the communication protocol to be utilized in the transmission of radio signal streams to one or more components of the wireless communication environment 100A/100B via the communication link 130, the transmission protocol being utilized for radio signal streams received from one or more other wireless devices of the wireless communication environment 100A/100B via antenna 330, and/or the communication protocol to be utilized for radio signal streams transmitted to one or more other wireless devices of the wireless communication environment 100A/100B via antenna 330.

For example, the transceiver unit 310 is configured to determine whether the radio signal streams that have been received include packetized radio signals (e.g., Ethernet protocol) or non-packetized radio signals (e.g., CPRI/OBSAI), and/or whether the radio signals to be transmitted are to be packetized or non-packetized radio signal streams.

In an exemplary embodiment, based on the determination of the transmission protocol, the transceiver unit 310 is configured to perform corresponding processing on received radio signal streams and/or on radio signal streams that are to be transmitted. For example, if the transceiver unit 310 has determined that the radio signals streams received via antenna 330 are to be transmitted to one or more components via one or more communication links 130 utilizing the Ethernet protocol, the transceiver unit 310 can packetize the radio signals prior to transmission to, for example, a ROE switching unit 115. Conversely, the transceiver unit 310 can de-packetize radio signals received by the transceiver unit 310 utilizing the Ethernet protocol prior to transmission via antenna 330. Further, in an exemplary embodiment, the transceiver unit 310 is configured to packetize the radio signal streams received from one or more components (e.g., a ROE switching unit 115) utilizing CPRI/OBSAI to transmit a packetized radio stream via antenna 330. Conversely, the transceiver unit 310 is configured to de-packetize a packetized radio signal stream received via antenna 330 prior to transmitting the radio signal stream to one or more components (e.g., a ROE switching unit 115) if CPRI/OBSAI is to be utilized. Further, the transceiver unit 310 can omit the packetization/de-packetization and route the radio signal stream utilizing the same communication protocol used in the reception of the radio signal stream.

The compression and PHY layer processing unit 325 includes suitable logic, circuitry, and/or code that is configured to perform compression/decompression and/or transmit/receive PHY layer processing on radio signals prior to transmission of the radio signals to one or more components of the wireless communication environment 100A/100B via one or more communication links 130. Similarly, the PHY layer processing unit 325 is configured to perform compression/decompression and/or transmit/receive PHY layer processing on signals received from one or more components of the wireless communication environment 100A/100B via one or more communication links 130. The signals received from and transmitted to the one or more components of the wireless communication environment 100A/100B can be provided to the compression and PHY layer processing unit 325 by the I/Q unit 315.

In an exemplary embodiment, the compression and PHY layer processing unit 325 is configured to perform lossless and/or lossy compression/decompression on signals utilizing one or more well-known compression/decompression techniques and/or perform transmit/receive PHY layer processing on the radio signals, such as, for example, performing symbol generation on samples received from the I/Q unit 315 and/or sample recovery from symbols received from I/Q unit 315. By implementing compression and/or PHY layer processing, the overall bandwidth of the wireless communication environment 100A/100B is reduced, thereby allowing for the number of RRHs 120 connected to the centralized baseband processing unit 105 to be increased without the need to increase the overall maximum bandwidth required for the wireless communication environment 100A/100B.

Figure 4:
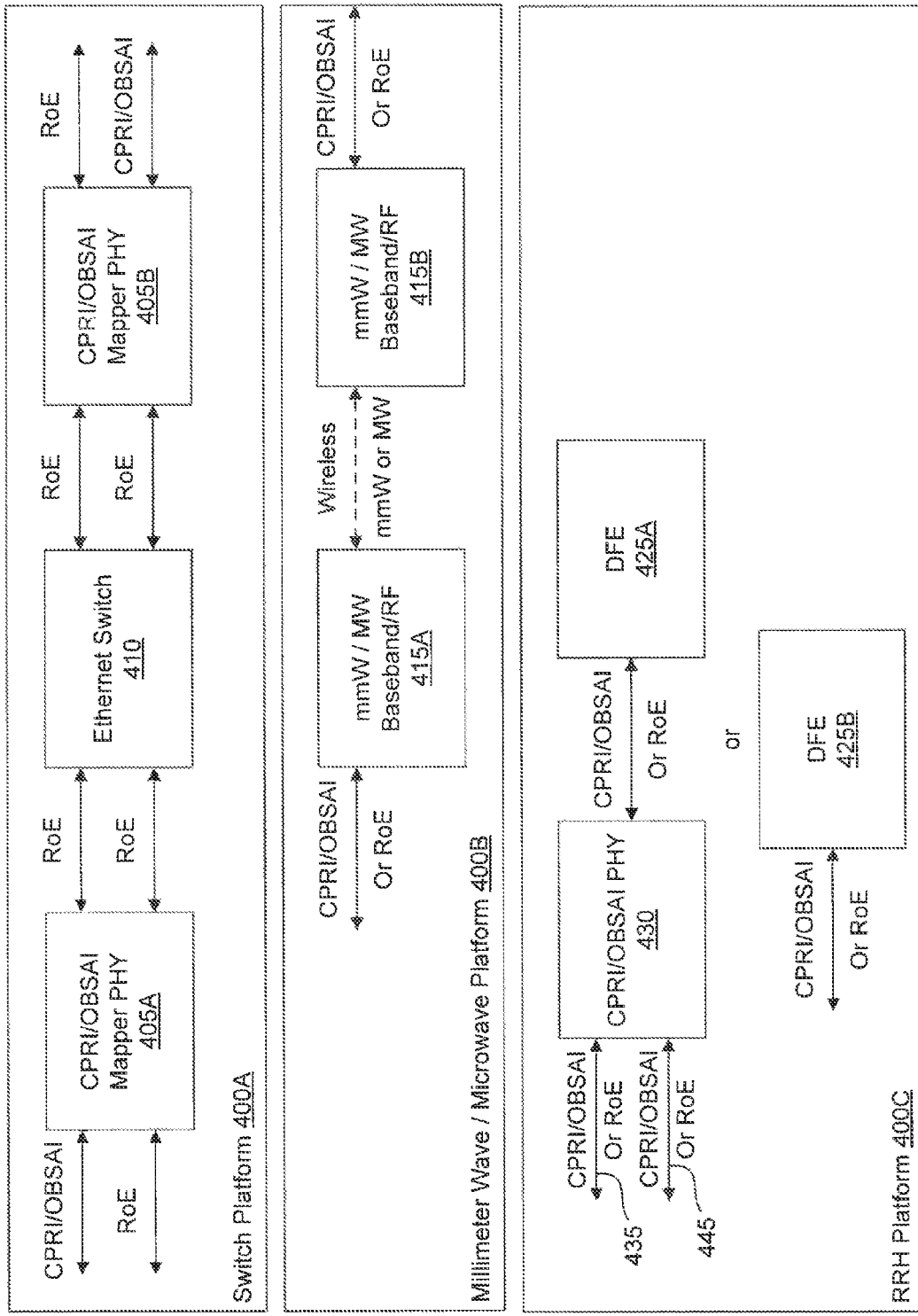
FIG. 4 illustrates multiple block diagrams of exemplary communication platforms in accordance with exemplary embodiments.

FIG. 4 illustrates multiple block diagrams of exemplary communication platforms 400A-C that can be implemented as part of the wireless communication environment 100A/100B according to exemplary embodiments of the present disclosure.

Switch platform 400A illustrates an exemplary functional operation of the various network paths of the wireless communication environment 100A/100B. For example, switch platform 400A illustrates the communication protocol conversion and switching operations that can be performed between the centralized baseband processing unit 105 and one or more RRHs 120.

The switch platform 400A can include CPRI/OBSAI mapper PHY units 405A-B, which each include suitable logic, circuitry, and/or code configured to convert radio signal streams (transmitted utilizing CPRI and/or OBSAI) to packetized signals (transmitted utilizing the Ethernet protocol), and vice-versa. That is, the CPRI/OBSAI mapper PHY units 405A-B can packetize radio stream signals which can then be transmitted utilizing the Ethernet protocol and/or de-packetize packetized radio signals which can be then transmitted utilizing CPRI and/or OBSAI. For example, the CPRI/OBSAI mapper PHY units 405A-B can packetize radio stream signals (e.g., CPRI/OBSAI signal) and/or can route packetized radio stream signals previously packetized (e.g., ROE signal) by and received from one or more RRHs 120.

The switch platform 400A also includes Ethernet switch 410, which includes suitable logic, circuitry, and/or code that is configured to route packetized radio signal streams that have been transmitted utilizing the Ethernet protocol to one or more components of the wireless communication environment 100A/100B. That is, the Ethernet switch 410 can route packetized radio stream signals (e.g., RoE signal) previously packetized by one of the various components of the wireless component environment 100A/100B, and/or route radio stream signals (e.g., CPRI/OBSAI signal) that were packetized by the CPRI/OBSAI mapper PHY units 405A-B.

More specifically, the switch platform 400A illustrates the protocol conversions performed at one or various points of the network path (e.g., the path from centralized baseband processing unit 105 to a RRH 120), including, for example, at the end points of the network paths (e.g., CPRI/OBSAI to Ethernet conversion by backhaul switching unit 110 and Ethernet to CPRI/OBSAI conversion by ROE switching unit 115), as well as the Ethernet protocol-based routing of packetized radio signals over the interior portions (e.g., between backhaul switching unit 110 and the various ROE switching units 115) of the network paths.

The millimeter wave (mmW)/Microwave (MW) platform 400B illustrates a functional operation of wireless CPRI (wCPRI) according to an exemplary embodiment. The millimeter wave (mmW)/Microwave (MW) platform 400B includes mmW/MW baseband/RF units 415A-B, which include suitable logic, circuitry, and/or code configured to convert signals received via CPRI/OBSAI and/or Ethernet protocols to mmW and/or MW wireless protocols, and vice-versa, to establish a wireless link between two or more components of the wireless communication environment 100A/100B. It should be appreciated by those skilled in the relevant art(s) that the wireless protocols should not be limited to mmW and MW, and the wireless communication paths can be established using other wireless communication protocols without departing from the spirit and scope of the present disclosure.

The RRH platform 400C illustrates a functional operation of a digital front-end within various network paths. The RRH platform 400C includes two exemplary network arrangements; the first (top) arrangement illustrates a network path where multiple RRHs $120_{A-N}$ are connected in series to one another prior to connecting to a ROE switching unit 115. For example, the first (top) path 435 of the CPRI/OBSAI PHY 430 can be connected to an ROE switching unit 115, while the second (bottom) path 445 of the CPRI/OBSAI PHY 430 can be connected to another RRH 120 (which can include a CPRI/OBSAI PHY unit 430 and DFE 425A pair). The second (bottom) arrangement illustrates a network path similar to the network arrangement in FIGS. 1A-B, where each RRHs $120_{A-N}$ is connected to a respective port of a ROE switching unit 115 (e.g., the ROE switching unit 115 is connected to each of the RRHs 120 in parallel).

The RRH platform 400C includes a CPRI/OBSAI mapper PHY unit 430 that includes suitable logic, circuitry, and/or code that is configured to convert one or more radio signal streams (transmitted utilizing CPRI and/or OBSAI) to packetized radio signal streams (transmitted utilizing the Ethernet protocol), and vice-versa. The CPRI/OBSAI mapper PHY 430 can also be configured to route one or more radio signal streams and/or packetized radio signal streams to digital front-end (DFE) 425A. The DFE 425A-B includes suitable logic, circuitry, and/or code that is configured to perform various signal processing functions on radio signal streams received from (and/or transmitted to) the wireless communication environment 100A/100B, and/or received from (and/or transmitted to) the CPRI/OBSAI mapper PHY unit 430.

CONCLUSION

The aforementioned description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A remote radio head (RRH), comprising:
   a transceiver unit configured to:
      receive a radio signal stream from a centralized baseband processor;
      de-packetize the received radio signal stream when a transmission protocol of the received radio signal stream is a packetized protocol and the RRH is configured to transmit a processed radio signal stream utilizing an unpacketized format; and
      packetize the received radio signal stream when the transmission protocol of the received radio signal stream is an unpacketized protocol and the RRH is configured to transmit the processed radio signal stream utilizing a packetized format; and
   a compression and physical (PHY) layer processing unit configured to process the de-packetized radio signal stream of the packetized radio signal stream to generate the processed radio signal stream, the processed radio signal stream being wirelessly transmitted to one or more remote devices via an antenna.

2. The RRH according to claim 1, wherein the transmission protocol is one of:
   an Ethernet protocol; and
   a Common Public Radio Interface (CPRI) protocol or an Open Base Station Architecture Initiative (OBSAI) protocol.

3. The RRH according to claim 2, wherein the transceiver unit is further configured to:
   de-packetize the received radio signal stream when the transmission protocol of the received radio signal stream is the Ethernet protocol and the RRH is configured to transmit the processed radio signal stream utilizing the unpacketized format; and packetize the received radio signal stream when the transmission protocol of the received radio signal stream is the CPRI protocol or the OBSAI protocol and the RRH is configured to transmit the processed radio signal stream utilizing the packetized format.

4. The RRH according to claim 1, wherein the compression and PHY layer processing unit is further configured to perform PHY layer processing on the de-packetized radio signal stream or the packetized radio signal stream.

5. The RRH according to claim 4, wherein the compression and PHY layer processing unit is further configured to:
   generate a symbol from a plurality of samples corresponding to the de-packetized radio signal stream or the packetized radio signal stream, wherein the processed radio signal stream includes the generated symbol; and
   generate one or more samples from a received symbol corresponding to the de-packetized radio signal stream or the packetized radio signal stream, wherein the processed radio signal stream includes the generated one or more samples.

6. The RRH according to claim 4, wherein the compression and PHY layer processing unit is further configured to compress or decompress the de-packetized radio signal stream or the packetized radio signal stream.

7. A radio over Ethernet (ROE) switching unit, comprising:
   a transceiver unit configured to:
      receive a packetized radio signal stream from a centralized baseband processor; and
      de-packetize the packetized radio signal stream when a determined transmission protocol utilized by a remote radio head (RRH) is an unpacketized protocol to generate a de-packetized radio signal stream; and
   a compression and physical (PHY) layer processing unit configured to process the de packetized radio signal stream or the packetized radio signal stream to generate a processed radio signal stream,
   wherein the ROE switching unit is configured to transmit the processed radio signal stream to the RRH utilizing:
      an unpacketized format when the determined transmission protocol is the unpacketized protocol, or
      a packetized format when the determined transmission protocol is a packetized protocol.

8. The ROE switching unit according to claim 7, wherein the compression and PHY layer processing unit is further configured to perform PHY layer processing on the de-packetized radio signal stream or on the packetized radio signal stream.

9. The ROE switching unit according to claim 8, wherein the compression and PHY layer processing unit is further configured to:
   generate a symbol from a plurality of samples corresponding to the de-packetized radio signal stream or the packetized radio signal stream, wherein the processed radio signal stream includes the generated symbol; and
   generate one or more samples from a received symbol corresponding to the de-packetized radio signal stream or the packetized radio signal stream, wherein the processed radio signal stream includes the generated one or more samples.

10. The ROE switching unit according to claim 7, wherein the compression and PHY layer processing unit is further configured to compress or decompress the de-packetized radio signal stream or the packetized radio signal stream.

11. The ROE switching unit according to claim 7, wherein the transmission protocol is one of:
   an Ethernet protocol; and
   a Common Public Radio Interface (CPRI) protocol or an Open Base Station Architecture Initiative (OBSAI) protocol.

12. The ROE switching unit according to claim 11, wherein the transceiver unit is further configured to:
   determine the transmission protocol utilized by the RRH; and
   de-packetize the packetized radio signal stream when the transmission protocol utilized by the RRH is the CPRI protocol or the OBSAI protocol.

13. A wireless communication system, comprising:
   a radio over Ethernet (ROE) switching unit in communication with a backhaul switching unit via a packetized transmission protocol, the backhaul switching unit being in communication with a centralized baseband processing unit via the packetized transmission protocol or an unpacketized transmission protocol; and
   a remote radio head (RRH) in communication with the ROE switching unit via the packetized or unpacketized transmission protocol;
   wherein the ROE switching unit comprises:
      a transceiver unit configured to:
         receive a packetized radio signal stream from the backhaul switching unit via the packetized transmission protocol; and
         de-packetize the packetized radio signal stream to generate a de-packetized radio signal stream; and
      a compression and physical (PHY) layer processing unit configured to perform compression processing and PHY layer processing on the de-packetized radio signal stream to form a processed radio signal stream, wherein the processed radio signal stream is communicated to the RRH via the unpacketized transmission protocol.

14. The wireless communication system according to claim 13, wherein the compression and PHY layer processing unit is further configured to:
   generate one or more samples from a symbol corresponding to the de-packetized radio signal stream to generate the processed radio signal stream; and
   generate a symbol from a plurality of samples corresponding to the de-packetized radio signal stream to generate the processed radio signal stream.

15. The wireless communication system according to claim 13, wherein the packetized transmission protocol is an Ethernet protocol, and
   wherein the unpacketized transmission protocol is a Common Public Radio Interface (CPRI) protocol or an Open Base Station Architecture Initiative (OBSAI) protocol.

16. The wireless communication system according to claim 13,
   wherein the RRH is configured to wirelessly communicate the processed radio signal stream to one or more remote devices.

17. The wireless communication system according to claim 16, wherein the compression and PHY layer processing unit is further configured to:
   generate one or more samples from a symbol corresponding to the de-packetized radio signal stream, wherein the processed radio signal stream includes the generated one or more samples; and
   generate a symbol from a plurality of samples of the de-packetized radio signal stream, wherein the processed radio signal stream includes the generated symbol.

18. The wireless communication system according to claim 13, wherein the RRH is configured to wirelessly communicate with the ROE switching unit.

19. The RRH according to claim 1, further comprising a synchronization module configured to send and receive synchronization data.

20. The RRH according to claim 19, wherein the transceiver is further configured to process time-stamp information embedded in the received radio signal stream.

21. The RRH according to claim 20, wherein the transceiver is further configured to insert the processed time-stamp information into the processed radio signal stream.

* * * * *

UNITED STATES PATENT AND TRADEMARK OFFICE
CERTIFICATE OF CORRECTION

PATENT NO. : 9,313,827 B2
APPLICATION NO. : 13/904972
DATED : April 12, 2016
INVENTOR(S) : Nicholas Ilyadis It is certified that error appears in the above-identified patent and that said Letters Patent is hereby corrected as shown below:

In the Claims

Column 17, Line 7, please replace "and PITY layer" with --and PHY layer--.

Column 17, Line 35, please replace "the de packetized radio" with --the de-packetized radio--.

Signed and Sealed this
Seventh Day of June, 2016

Michelle K. Lee
*Director of the United States Patent and Trademark Office*